(12) United States Patent
Bui

(10) Patent No.: US 10,968,928 B2
(45) Date of Patent: Apr. 6, 2021

(54) FILM FOR INCREASING FRICTION BETWEEN TWO FRICTIONALLY CONNECTED COMPONENTS

(71) Applicant: Bayerische Motoren Werke Aktiengesellschaft, Munich (DE)

(72) Inventor: Hoang Viet Bui, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 119 days.

(21) Appl. No.: 15/954,034

(22) Filed: Apr. 16, 2018

(65) Prior Publication Data

US 2018/0231033 A1 Aug. 16, 2018

Related U.S. Application Data

(63) Continuation-in-part of application No. PCT/EP2016/059804, filed on May 3, 2016.

(30) Foreign Application Priority Data

Oct. 16, 2015 (DE) ...................... 10 2015 220 169.4

(51) Int. Cl.
| | |
|---|---|
| F16B 2/00 | (2006.01) |
| C09J 7/20 | (2018.01) |
| B32B 7/12 | (2006.01) |
| B32B 37/18 | (2006.01) |

(52) U.S. Cl.
CPC .............. *F16B 2/005* (2013.01); *B32B 7/12* (2013.01); *B32B 37/182* (2013.01); *C09J 7/20* (2018.01); *B32B 2250/03* (2013.01); *B32B 2605/00* (2013.01)

(58) Field of Classification Search
None
See application file for complete search history.

(56) References Cited

U.S. PATENT DOCUMENTS

| | | | |
|---|---|---|---|
| 4,525,098 A | 6/1985 | Krude et al. | |
| 6,524,681 B1 * | 2/2003 | Seitz ...................... | D06N 7/00 104/18 |
| 2008/0308365 A1 | 12/2008 | Foge et al. | |
| 2011/0045226 A1 | 2/2011 | Horling et al. | |
| 2013/0269873 A1 | 10/2013 | Herzinger et al. | |

(Continued)

FOREIGN PATENT DOCUMENTS

| | | |
|---|---|---|
| CN | 1061467 A | 5/1992 |
| CN | 101910465 A | 12/2010 |
| CN | 103026092 A | 4/2013 |

(Continued)

OTHER PUBLICATIONS

English translation of Chinese-language Office Action issued in counterpart Chinese Application No. 201680037121.0 dated Feb. 1, 2019 (nine (9) pages).

(Continued)

*Primary Examiner* — Frank D Ducheneaux
(74) *Attorney, Agent, or Firm* — Crowell & Moring LLP

(57) ABSTRACT

A film for arranging and increasing the friction between two frictionally joined components, in particular of a motor vehicle, is provided. The film includes a load-bearing matrix and a plurality of hard particles arranged in the matrix. A process for producing such a film is also provided.

11 Claims, 1 Drawing Sheet

(56) References Cited

U.S. PATENT DOCUMENTS

2013/0322804 A1    12/2013    Von Schleinitz
2014/0065334 A1*   3/2014    Henderson .............. B65B 11/06
                                                                428/35.7

FOREIGN PATENT DOCUMENTS

| | | |
|---|---|---|
| CN | 103261005 A | 8/2013 |
| CN | 103314058 A | 9/2013 |
| DE | 31 49 596 A1 | 6/1983 |
| DE | 198 23 928 A1 | 12/1999 |
| DE | 10 2008 036 796 A1 | 2/2010 |
| DE | 10 2009 023 402 A1 | 12/2010 |
| DE | 10 2008 036 796 B4 | 7/2013 |
| DE | 10 2012 009 362 A1 | 11/2013 |
| EP | 1 959 152 A2 | 8/2008 |
| EP | 2 848 824 A1 | 3/2015 |

OTHER PUBLICATIONS

German-language Search Report issued in counterpart German Application No. 10 2015 220 169.4 dated Jun. 16, 2016, with partial English translation (eleven (11) pages).

International Search Report (PCT/ISA/210) issued in corresponding International Application No. PCT/EP2016/059804 dated Jul. 7, 2016, with English translation (five (5) pages).

Japanese-language Written Opinion (PCT/ISA/237) issued in corresponding International Application No. PCT/EP2016/059804 dated Jul. 7, 2016, (five (5) pages).

Chinese-language Office Action issued in Chinese Application No. 201680037121.0 dated Apr. 29, 2020 with English translation (12 pages).

English translation of Chinese-language Office Action issued in Chinese Application No. 201680037121.0 dated Nov. 2, 2020 (five (5) pages).

* cited by examiner

FILM FOR INCREASING FRICTION BETWEEN TWO FRICTIONALLY CONNECTED COMPONENTS

CROSS REFERENCE TO RELATED APPLICATIONS

This application is a continuation-in-part of PCT International Application No. PCT/EP2016/059804, filed May 3, 2016, which claims priority under 35 U.S.C. § 119 from German Patent Application No. 10 2015 220 169.4, filed Oct. 16, 2015, the entire disclosures of which are herein expressly incorporated by reference.

BACKGROUND AND SUMMARY OF THE INVENTION

The present invention relates to a film which is arranged between two frictionally joined components. The film here increases the friction between the two components. In particular, the components are two components of a motor vehicle. Furthermore, the invention relates to a process for producing the film, a method for joining two components and also a joining arrangement.

The prior art describes processes for applying hard particles to component surfaces in order to increase the coefficient of friction. For example, hard particles are mixed with a binder (for example a surface coating composition) and applied to the appropriate surface. A disadvantage here is handling of the surface coating composition and the curing time required.

As an alternative, it is also possible to apply the hard particles directly to the component surface in a blasting process, for example using the plasma GRIP process. However, this requires relatively expensive and complicated plants.

It is an object of the present invention to provide a possible way of increasing friction between two frictionally joined components, which provides inexpensive production and simple installation and at the same time makes possible an operationally reliable increase in the friction and thus an improvement in the join.

This and other objects are achieved by a film for arranging and increasing a friction between two frictionally joined components, which film includes a load-bearing matrix and a plurality of hard particles arranged in the matrix, in accordance with embodiments of the invention.

Such an object is thus achieved by a film. The film is intended for arrangement between two frictionally joined components. The two components can, here and in the following, also be referred to as first component and second component. The two components are preferably present in a motor vehicle. For example, the film is arranged between a wheel bearing unit and a wheel mount. The film includes a load-bearing matrix. The matrix is preferably made up at least partially of a plastic. A plurality of hard particles are embedded in this matrix. These hard particles are significantly harder than the matrix. The hard particles preferably include a different material from the matrix. The hard particles provide an increase in friction between the two components. At a microscopic level, the hard particles provide physical locking between the two components.

The hard particles can, for example, be completely enclosed in the matrix. Furthermore, it is possible for the hard particles to project at least partly from a surface of the matrix. The film can also be configured in such a way that the hard particles project at least partly from the two surfaces of the matrix, i.e., from the two opposite surface sides of the matrix.

According to an embodiment of the invention, the coefficient of friction between the faces of the components which are pressed against one another is increased by the film being applied to at least one of these faces before assembly. Then, the hard particles become at least partly buried in the other (opposite) face during assembly, i.e., on clamping in the course of mounting of the two components.

For example, annoying noises or cracking noises can occur at the connecting point between a wheel mount and a wheel bearing during operation. To reduce or avoid these noises, the nature of the surface of at least one of these components is modified in a targeted manner by installation of the film in such a way that the coefficient of friction is increased by additional physical locking. This is because, viewed on the micro level, the hard particles provided according to the embodiment of the invention become partly buried in the surface structure of the respective other component on pressing said components against one another and effectively produce microscopic physical locking.

A critical advantage of the film is that it can be cut to size according to the particular application and thus be matched to the geometry of the components. The film is advantageously present in the form of a roll and is thus a "continuous material" which is employed, in particular, in the case of short runs or repair work.

It is advantageous for at least one side of the film to have a self-adhesive layer. This self-adhesive layer is, in particular, covered with a covering film. The covering film is pulled off before adhesive bonding to the component. The self-adhesive layer simplifies mounting of the film on the component surface, since slipping of the film is avoided during assembly of the two components.

The materials for the matrix and the hard particles are preferably corrosion-neutral in respect of contact with the joined components. The components are, in particular, made of steel, aluminum or carbon fiber-reinforced plastic. The film according to the embodiment of the invention thus makes electrochemical separation between the two components possible. Electrically nonconductive materials or noble metals are particularly preferably selected for the matrix and the hard particles.

The matrix preferably includes one of the following materials: glass fiber-reinforced plastic, aramid fiber-reinforced plastic, polyvinyl fluoride, titanium or a titanium alloy. These materials in particular make electrochemical separation of the two components possible. As a result, satisfactory corrosion protection can advantageously be ensured.

In a further embodiment, the matrix can include a nonwoven, paper, entangled fibers and/or a porous structure. Furthermore, the matrix can include a nonwoven, paper, entangled fibers, or a porous structure.

Furthermore, preference is given to using hard particles composed of the following materials: silicon carbide and/or nickel-silicon carbide and/or nickel-diamond powder and/or steel and/or cast stainless steel (also: Cr grit) and/or chilled cast iron and/or α-alumina particles. It is also possible for different hard particles to be applied to a matrix.

In particular, the hard particles have a size ("diameter") of a plurality of (for example 1-70) microns and are not distinguished merely by a particularly high hardness but preferably also by an exceptionally sharp-edged nature, i.e., their surface preferably has a plurality of corners and edges. It is known that, for example, silicon carbide can be applied extremely durably to surfaces by plasma technology, cf. the "plasma GRIP" technology of efc plasma GmbH, Ingolstadt. Here, these hard particles are held by way of a nickel bonding layer on the plasma-technologically coated surface. It should be expressly stated that, however, the mention of this example does not restrict the present invention in any way to such hard particles; rather, various other materials and processes can be used. The important thing is that the particles are hard enough to penetrate at least partly into the surface of the components. Physical locking is produced thereby as a result of the hard particles being pressed to at least some extent into the respective opposite piece. Furthermore, the total surface area over which the two components are joined to one another is increased by these hard particles, which brings about an additional increase in the frictional force acting between these components.

The film of the invention is advantageously configured as a tape. The tape has a length which is at least 10 times its width. In particular, the tape is present as a roll, so that the required amount can be pulled off in the interests of simple handling. In conjunction with the above-described self-adhesive layer, the film is thus an adhesive tape.

Furthermore, a method for joining two components is provided. In the method, a first component and a second component and also a film as described here are provided. The film can thus have one or more of the features of the above-mentioned embodiments. In the method, the film is applied to the first component. The film can, for example, be adhesively bonded to the first component, for example via the side which has the self-adhesive layer. The second component is subsequently arranged on the film, in particular on the surface of the film facing away from the first component. The components are then frictionally joined so that hard particles of the film penetrate at least partly into the surface of at least one of the components. Hard particles of the film preferably penetrate at least partly into the surface of the first component and into the surface of the second component. The penetration of the hard particles into the surfaces of the components advantageously increases the friction between the two components.

In a further embodiment, the frictional joining of the components is effected after arrangement of the second component on the film by screwing, clamping and/or pressing of the components, with hard particles of the film penetrating into one of the components or into both components.

In a further embodiment, the matrix of the film includes a porous structure, for example a nonwoven or an insulation material. The porous structure can have a plurality of voids. The hard particles can be enclosed partly or completely in the porous structure. As a result of the porous structure of the matrix, the frictional joining or the screwing, clamping and/or pressing of the components can be simplified, since the porous structure can easily be pressed to a small size. Furthermore, the porous structure can have a capillary effect in order to increase adhesion to the surface, in particular for liquids, e.g., an oil film, on the surface of the first and/or second component. In this way, a self-adhesive layer can advantageously also be dispensed with.

The invention further encompasses an arrangement including the two frictionally joined components and the film described here between the two components. The components are in particular two components of a motor vehicle. The two components preferably include steel, aluminum (or an aluminum alloy) or carbon fiber-reinforced plastic. The advantageous embodiments described in connection with the film of the invention can correspondingly be employed advantageously for the arrangement of the invention. The arrangement can, in particular, be produced by an above-described process.

The invention further encompasses a process for producing the film described. Firstly, the matrix is provided and, in a further step, the hard particles are applied to the matrix. The application of the hard particles is effected here by acceleration, advantageously by way of a blasting process, or by increased pressure.

In the blasting process, the hard particles are accelerated in such a way that they penetrate at least partly into the matrix. As an alternative, it is also possible to press the hard particles into the matrix by way of appropriately high pressure. For this purpose, the hard particles are, for example, laid on the matrix and rolled in.

The hard particles can penetrate completely or only partly into the matrix. The important thing is that the hard particles remain in the matrix until the film is used. On pressing the two components together, the matrix is in any case deformed so that the hard particles project from the matrix on both sides and penetrate into the two surfaces of the components.

The advantageous embodiments described in connection with the film of the invention can correspondingly be employed advantageously for the process of the invention.

In particular, the hard particles are applied by one of the following methods: pressure blasting, injection blasting or plasma blasting. Particular preference is given here to atmospheric-pressure plasma blasting or low-pressure plasma blasting or vacuum plasma blasting.

A self-adhesive layer is preferably arranged on at least one side of the matrix. The self-adhesive layer can be formed either before or after application of the hard particles.

After application of the hard particles, the film is advantageously rolled up and is thus present as rolled tape or adhesive tape.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
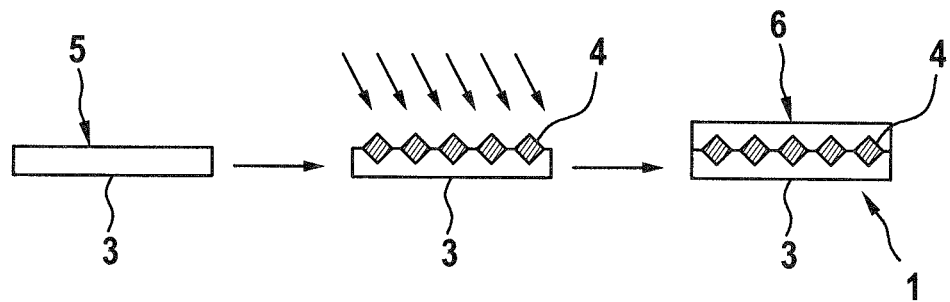
FIG. 1 is a schematic depiction of the production of a film according to an embodiment of the invention.

FIG. 1 shows, in a schematically simplified depiction, the process for producing a film 1 according to an embodiment of the invention.

Firstly, a matrix 3, for example composed of a plastic, is provided. A plurality of hard particles 4 are introduced into this matrix 3. The depiction in FIG. 1 shows a blasting process in which the hard particles 4 are accelerated. On impingement on the matrix 3, the hard particles 4 penetrate at least partly into the matrix 3 and are thus fixed in the matrix 3.

As an alternative to the blasting process, it is also possible to lay the hard particles 4 on the matrix 3 and to increase the pressure of the hard particles 4 onto the matrix 3. This is effected, for example, by rolling-in of the hard particles 4. It is also possible for the hard particles 4 to penetrate into the matrix 3 as a result.

The invention provides, in particular, for the hard particles 4 not to be bound by way of a binder to the matrix 3. Rather, the hard particles 4 penetrate into the matrix 3 as a result of appropriate acceleration or increased pressure. The matrix 3 is preferably present in solid form.

In the depiction in FIG. 1, the matrix 3 has a self-adhesive layer 5 on one side. After application of the hard particles 4, the self-adhesive layer 5 is covered with a covering film 6. This makes it possible, in particular, to roll up the film 1 and provide it as adhesive tape.

The self-adhesive layer 5 does not have to be present on the side to which the hard particles 4 are also applied. When the self-adhesive layer 5 is present on the opposite side, the covering film 6 can also be applied before application of the hard particles 4. Furthermore, it is also possible for the hard particles 4 to penetrate through the covering film 6 into the matrix 3.

Figure 2:
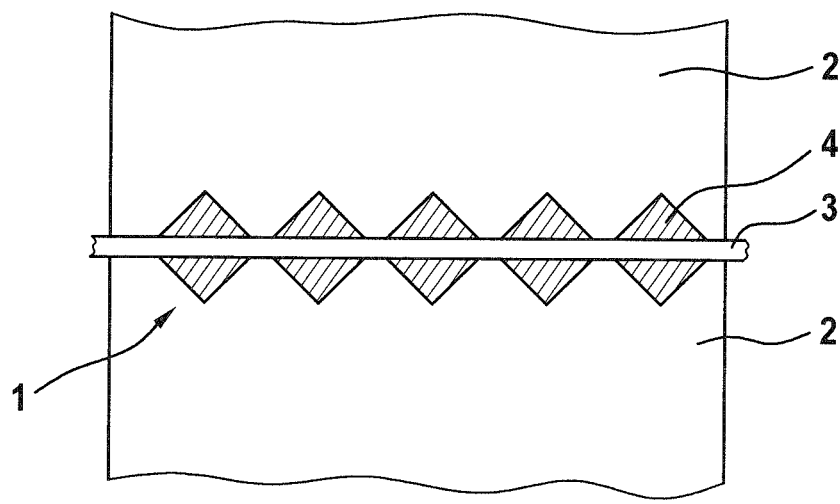
FIG. 2 is a view of a film in an arrangement with two components according to an embodiment of the invention.

FIG. 2 shows the inventive arrangement made up of two components 2 and the film 1 arranged in-between. The two components 2 are, in particular, two frictionally joined components 2 of a motor vehicle.

As a result of the frictional joining of the two components 2, the hard particles 4 penetrate into the two surfaces of the components 2. This increases the friction between the two components 2.

When, as shown in FIG. 1, the hard particles 4 do not project from the matrix 3 on both sides, the matrix 3 is deformed during assembly of the two components 2 so that the hard particles 4 can penetrate into the components 2 on both sides.

In various trials, it has been found that the desired effect of the hard particles 4, according to an embodiment of the invention, increases with increasing running of a vehicle in which joining partners or components 2, for example in the bodywork, in the interior trim or in drive or chassis components, are configured according to the embodiment of the invention. That is, the longer such a vehicle is operated, the better is, at least over the first 50,000 km of travel, the intended effect, namely a reduction in the cracking or creaking noises which otherwise occasionally occur and/or a measurable increase in the stiffness or strength (of the joining arrangement in question). It has been found to be advantageous here for, in the case of a materials pairing of high hardness. That is, when the join partners or components 2 which are releasably pressed against one another in each case include (or consist of) a relatively hard material (for example steel), hard particles having a size ("diameter") in the range of 10-30 microns (μm) to be distributed to a moderate extent, i.e., in a proportion by area in the order of 10%, over the (total) contact area of the join partner or partners. On the other hand, if the join partners or components 2 for their part include (or consist of) a relatively soft material, for example an aluminum alloy, hard particles 4 having a size ("diameter") in the range of 30-70 microns (μm) distributed with a higher proportion by area in the order of magnitude of 20% of the total contact area of the join partner or partners have been found to be advantageous. Moreover, if one of the join partners or components 2 includes (or consists of) a relatively hard material and the other join partner includes (or consists of) a considerably softer material, hard particles having an average particle size in the order of magnitude of 20-40 μm which cover approximately 15% of the total contact area are preferred.

Deviating from the embodiment as mentioned above, in which the hard particles 4 are distributed substantially uniformly over the total contact area of one join partner or (in the assembled state) both join partners, it can also be advantageous, depending on the particular application, for the hard particles 4 to be distributed nonuniformly over the contact area. Thus, when a plurality of fastening elements which run through the contact areas of the join partners in holes running usually perpendicular thereto and in the process clamp the join partners or components 2 against one another are provided in the form of screws, it is possible for the hard particles 4 to be applied only in the relative close proximity of the screws on at least one of the contact areas (before joining together of the join partners or the components 2). The highest pressure per unit area, viewed over the total contact area, after clamping together of the join partners is present in the direct vicinity of these screws and the hard particles 4 are therefore pressed best into the respective other join partner on clamping of the join partners or components 2. However, it can be necessary, in the case of particular materials pairings of the join partners or in particular applications, i.e., when particular join partners are joined to one another, to press the join partners as strongly as possible against one another, for example for sealing reasons (namely to prevent penetration of water molecules into the crack of the join), so that the hard particles 4 should then preferably be located away from said screws, i.e., with exclusion of the close proximity of the screws in the contact area.

LIST OF REFERENCE NUMERALS

1 Film
2 Components
3 Matrix
4 Hard particles
5 Self-adhesive layer
6 Covering film The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A film for arranging and increasing a friction between two frictionally joined components, comprising:
   a load-bearing matrix; and
   a plurality of hard particles arranged in the matrix,
   wherein the hard particles are not bound by way of a binder to the matrix,
   wherein at least one side of the film has a self-adhesive layer for adhesive bonding onto one of the two components, and wherein the self-adhesive layer is covered with a covering film.

2. The film according to claim 1, wherein the materials for the matrix and the plurality of hard particles are corrosion-neutral in respect of contact with steel, aluminum or carbon fibers.

3. The film according to claim 2, wherein the matrix includes or consists of one of the following materials: glass fiber-reinforced plastic, aramid fiber-reinforced plastic, polyvinyl fluoride, titanium or a titanium alloy.

4. The film according to claim 2, wherein
   the matrix includes a nonwoven, paper, entangled fibers and/or a porous structure, or
   the matrix consists of a nonwoven, of paper, of entangled fibers or of a porous structure.

5. The film according to claim 2, wherein the plurality of hard particles are composed of at least one of the following materials: silicon carbide, nickel-silicon carbide, nickel-diamond powder, steel, cast stainless steel, Cr grit, chilled cast iron, or α-alumina particles.

6. The film according to claim 1, wherein the matrix includes or consists of one of the following materials: glass fiber-reinforced plastic, aramid fiber-reinforced plastic, polyvinyl fluoride, titanium or a titanium alloy.

7. The film according to claim 1, wherein
the matrix includes a nonwoven, paper, entangled fibers and/or a porous structure, or
the matrix consists of a nonwoven, of paper, of entangled fibers or of a porous structure.

8. The film according to claim 1, wherein the plurality of hard particles are composed of at least one of the following materials: silicon carbide, nickel-silicon carbide, nickel-diamond powder, steel, cast stainless steel, Cr grit, chilled cast iron, or α-alumina particles.

9. The film according to claim 1, wherein the film is configured as a tape, with a length of the film being at least ten times a width of the film.

10. The film according to claim 1, wherein the two frictionally joined components are components of a motor vehicle.

11. A joining arrangement comprising:
a first component;
a second component; and
a film according to claim 1, wherein
the first component is joined to the second component by way of the film, whereby the first component to which the film is applied and the second component which is arranged on the film are frictionally joined in such a way that the plurality of hard particles of the film penetrate at least partly into a surface of the first component and at least partly into a surface of the second component.

* * * * *